United States Patent [19]

Bray

[11] Patent Number: 4,640,607
[45] Date of Patent: Feb. 3, 1987

[54] SIMPLEX TO DUPLEX COPIER APPARATUS

[75] Inventor: Richard L. Bray, Rochester, N.Y.

[73] Assignee: Eastman Kodak Company, Rochester, N.Y.

[21] Appl. No.: 680,707

[22] Filed: Dec. 12, 1984

[51] Int. Cl.$^4$ ............................................. G03G 15/00
[52] U.S. Cl. ................................ 355/14 R; 355/14 SH
[58] Field of Search ................... 355/14 SH, 14 R, 23, 355/24, 14 C, 14 CU; 271/3.1, 4

[56] References Cited

U.S. PATENT DOCUMENTS

| | | |
|---|---|---|
| 4,158,500 | 6/1979 | Di Francesco et al. |
| 4,191,465 | 3/1980 | Boase et al. |
| 4,248,528 | 2/1981 | Sahay |
| 4,310,235 | 1/1982 | Lorenzo et al. |
| 4,330,197 | 5/1982 | Smith et al. ..................... 355/14 SH |

OTHER PUBLICATIONS

*Xerox Disclosure Journal*, vol. 7, No. 1, Jan./Feb. 1982, Acquavira, T., "Programmable Automatic Document Feeder", p. 7.

Research Disclosure, Feb. 1976, No. 14237.

Primary Examiner—Arthur T. Grimley
Assistant Examiner—J. Pendegrass
Attorney, Agent, or Firm—Milton S. Sales

[57] ABSTRACT

A copier for producing a set of duplex copies from a set of simplex originals in which the copy set has subsets in which the first page of each subset is on the front side of a copy. The copier includes an image-producing section for producing images of originals at an exposure position; a circulating feeder for receiving a set of simplex originals at a receiving position and for sequentially circulating individual originals from the receiving position to the exposure position of the producing section and then back to the receiving position. A supply of copy sheets is provided to selectively supply copy sheets to the producing section to receive images on both sides thereof. The copier includes a logic and control unit operable in a setup mode for controlling the circulating feeder to circulate originals one at a time under operator control. An operator actuable switch is provided to designate individual simplex originals which are to be the first pages of subsets of duplex copies. The control unit also is operable in a producing mode for controlling the circulating feeder to circulate the simplex originals to the exposure position; for controlling the producing section to produce sequential images of the original; and for controlling the copy sheet supply to supply to the producing section copy sheets to receive images of simplex originals on the front and back sides of copy sheets with the designated first page of each subset being received on the front side of a copy sheet.

6 Claims, 5 Drawing Figures

SIMPLEX TO DUPLEX COPIER APPARATUS

BACKGROUND OF THE INVENTION

This application is a continuation of U.S. application Ser. No. 565,933, filed Dec. 27, 1983, now abandoned.

This invention relates to copier apparatus for copying a set of simplex originals to produce a set of duplex copies. More particularly, this invention relates to electrophotographic apparatus for copying a set of simplex originals to produce a set of duplex copies having subsets in which the first page of each subset is on the front side of a copy.

In the copier field, the trend has been to higher and higher copying speeds with as little operator intervention as possible in order to maintain a high copy rate output. Thus, the manual placement of originals on the exposure platen of a copier to produce copies of each original has been replaced in higher speed copiers with automatic feeders which automatically feed originals to the exposure platen of the copier. Whether the original is placed on the platen manually or by means of automatic feeder, copiers are capable of producing simplex copies from simplex originals, simplex copies from duplex originals, duplex copies from simplex originals, and duplex copies from duplex originals. Thus, in Research Disclosure No. 14237, dated February 1976, entitled "Electrophotographic Copying Apparatus For Two-Sided Copying," an electrophotographic copier is disclosed in which simplex originals manually placed on a platen may be copied automatically in either a simplex or duplex mode of operation. In commonly assigned U.S. Pat. No. 4,158,500, issued June 19, 1979, for "Apparatus For Producing Collated Copies In Page Sequential Order," by A. B. DiFrancesco, there is disclosed apparatus for producing duplex or simplex collated copies from duplex and simplex originals. The copier includes a recirculating feeder for sequentially feeding simplex or duplex originals to an exposure platen of the copier for producing images on copy sheets in either a simplex or duplex mode. Commonly assigned U.S. Pat. No. 4,191,465, issued Mar. 4, 1980, entitled, "Apparatus For Producing Simplex Or Duplex Copies," by E. E. Boase et al, discloses apparatus operable in duplex and simplex modes for making copies having images on one or both sides thereof, in a single pass of a copy sheet through the copier. The apparatus may include a recirculating feeder which positions either simplex or duplex originals at the exposure platen of the copier.

Although the copier apparatus disclosed in the latter patents and publication may be useful for the purposes for which they were intended, in selected copying runs it may be desirable to produce a duplex copy set from a simplex original set in which the copy set is segmented into subsets or chapters with the first page of each subset or chapter being copied on the front side of a copy sheet. It may also be desirable to provide such a first page copy sheet with a different characteristic than the other copy sheets; for example, having a different color than the other copy sheets. In U.S. Pat. No. 4,248,528, issued Feb. 3, 1981, for "Copier With Document Sensing Control," by R. B. Sahay, there is disclosed a copier in which preprinted and operator-marked control sheets are fed together with regular documents by a copier document feeder past an optical scanner to program the copier to process the selected documents in a manner instructed by the control sheets. The optical scanner may also be used to determine whether or not an original in a set of originals is simplex or duplex so that the corresponding copy will be produced as a duplex of simplex copy. This patent is disadvantageous in requiring the use of special scanning equipment and the use of special control sheets which add expense and complexity to the copier. In U.S. Pat. No. 4,310,235, issued Jan. 12, 1982, for "Job Programming," by J. A. Lorenzo et al, a reproduction machine is provided having a card reader for reading marked cards which contain job stream information such as the selection of simplex copying within a duplex job and vice versa. This reproduction apparatus is also complex and expensive in necessitating a separate card reader and means for feeding the cards to the reader.

Thus, it would be desirable to provide a copier in which a simplex set of originals could be copied as duplex copies automatically in which the duplex copy set can be segmented into subsets or chapters with the first page of each subset being copied on the front page of a duplex copy.

SUMMARY OF THE INVENTION

According to the present invention, there is provided apparatus for copying a set of simplex originals to produce a set of duplex copies having subsets in which the first page of each subset is on the front side of a copy sheet. The apparatus includes producing means for producing images of originals and having an exposure position; a circulating means for receiving a set of simplex originals at a receiving position and for sequentially circulating individual originals from the receiving position to the exposure position and then back to the receiving position; and supply means for selectively supplying copy sheets to receive images from the producing means. The copier apparatus also includes control means operable in a setup mode for controlling said circulating means to circulate originals one at a time under operator control wherein the control means includes an operator actuatable means for designating individual simplex originals as the first pages of subsets of duplex copies. The control means is also operable in a producing mode for controlling the circulating means to circulate simplex originals to said exposing position for controlling said producing means to produce sequential images of said originals and for controlling said supply means to supply to said producing means copy sheets to receive images of simplex originals on the front and back sides of said copy sheets with a designated first page of each subset being received on the front side of a copy sheet.

The invention and its features and advantages will be set forth and become more apparent in the detailed description of the preferred embodiment presented below.

BRIEF DESCRIPTION OF THE DRAWINGS

In the detailed description of the preferred embodiment of the invention presented below, like numbers indicating like elements in which.

DESCRIPTION OF THE PREFERRED EMBODIMENT

To assist in understanding the present invention, it will be useful to consider an electrophotographic copier having a logic and control unit, an operator control panel, and a circulating original feeder. It will be noted that although the invention is suitable for use with a circulating feeder it may also be used with other types of feeders.

Figure 1:
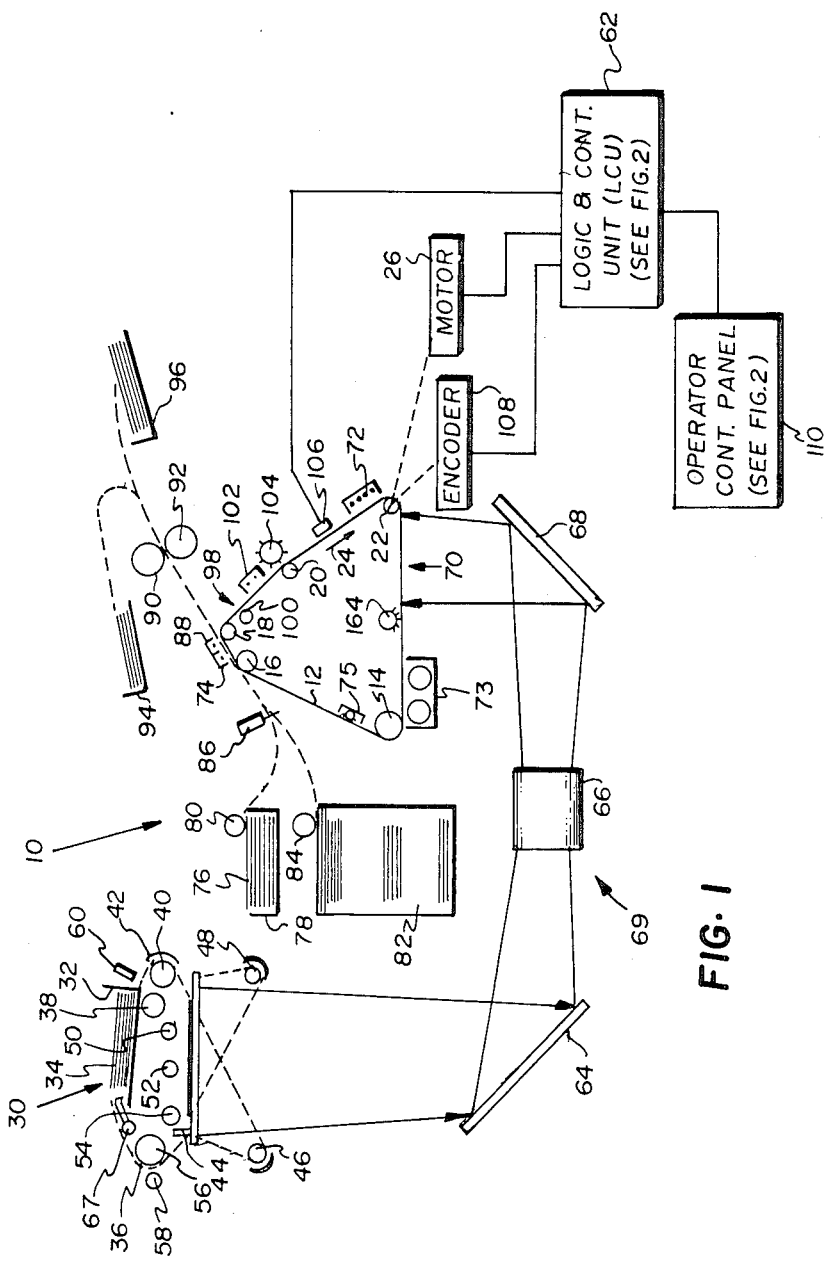
FIG. 1 is a schematic diagram of copier apparatus according to the present invention.

Referring now to FIG. 1, there is shown an electrographic copier 10 having a photoconductive belt 12 trained about rollers 14, 16, 18, 20, and 22. Belt 12 is moved in a clockwise direction as represented by arrow 24 by means of motor 26 mechanically linked to roller 22. Copier 10 includes an exposure position comprising exposure platen 28.

Located on top of exposure platen 28 is a circulating feeder 30 having a receiving position such as tray 32 for receiving a set of originals 34. In general, circulating feeder 30 sequentially circulates originals 34 along path 36 from the bottom of tray 32 to exposure platen 28 and then back up to the top of the set of originals in tray 32. This is effected by means of feed roller 38 which feeds the bottommost original in tray 32 between guide roller 40 and guide 42 onto platen 28 where the original is stopped by gate 44.

After exposure by flash lamps 46 and 48, gate 44 is moved out of path 36 and roller 50, 52, 54, 56, and 58 move original 34 back to the top of the set of originals in tray 32. As will be described in greater detail later as an original 34 moves along path 36 away from tray 32, a detector 60 generates a count signal which is supplied to logic and control unit 62. A set count finger 61 is also provided for resting on the top of a set and for indicating when a set of originals has been circulated by feeder 30.

When an original has been illuminated by flash lamps 46 and 48, an image is produced which is projected by mirror 64, lens 66, and mirror 68 onto belt 12 at exposure station 70. In advance of exposure station 70 is a charging station comprising corona charger 72 which sensitizes belt 12 by applying an electrostatic charge thereon (for example, a negative electrostatic charge). At exposure station 70, the projected light image dissipates the electrostatic charge at the exposed areas of the photoconductor to form a latent electrostatic image corresponding to the image of the original.

The latent electrostatic image is developed at magnetic brush developing station 73 which applies a developer including iron carrier particles and electroscopic toner particles with an electrostatic charge (e.g., a positive charge) opposite to that of the latent electrostatic image.

The toner image is subjected to radiation by post-development erase lamp 75 to reduce the electrical stress on photoconductive belt 12 and to reduce the attraction between the toner image and belt 12.

As the toner image approaches transfer corona charger 74, a copy sheet 76 is fed from either supply 78 by feed roller 80 or from supply 82 by feed roller 84 to registration mechanism 86. At a proper time registration mechanism 86 releases sheet 76 which is moved into registration with the toner image on belt 12 in advance of corona charger 74. Charger 74 transfers the toner image to copy sheet 76 by applying a charge (e.g., a negative charge) opposite in polarity to that of the toner image. Detack charger 88 neutralizes the charge on sheet 76 so that it separates at roller 18. Sheet 76 is passed through heated fuser rollers 90 and 92 to permanently fuse the toner image to sheet 76. The copy sheet is then transported to an upper output tray 94 or to a side output tray 96.

Cleaning station 98 is provided to effect mechanical and electrical cleaning of photoconductive belt 12. Station 98 includes a cleaning assist erase lamp 100 which exposes photoconductive belt 12 to radiation to substantially reduce any charge remaining on belt 12; a cleaning assist charger 102 which impresses an alternating current charge on belt 12 to neutralize the charges on untransferred toner particles; and a brush 104 to remove any residual toner from belt 12 so that it is ready for another electrophotographic cycle.

To coordinate operation of the various instrumentalities of copier 10, including feeder 30, with movement of image areas of belt 12, belt 12 has a plurality of perforations along one of its edges. These perforations generally are spaced equi-distantly along the edge of belt 12. For example, belt 12 may be divided into six image areas by F perforations and each image area may be subdivided into 51 sections by C perforations. The relationship of the F and C perforations to the image areas is disclosed in detail in commonly assigned U.S. Pat. No. 3,914,047. At a fixed location along the path of movement of belt 12, there is provided a detector 106 for detecting belt perforation and for providing timing pulses to logic and control unit 62. An encoder 108 is linked to roller 22 and provides a series of timing pulses to logic and control unit 62 which are used in conjunction with the pulses from detector 106 to control the operation of copier 10.

Figure 2:
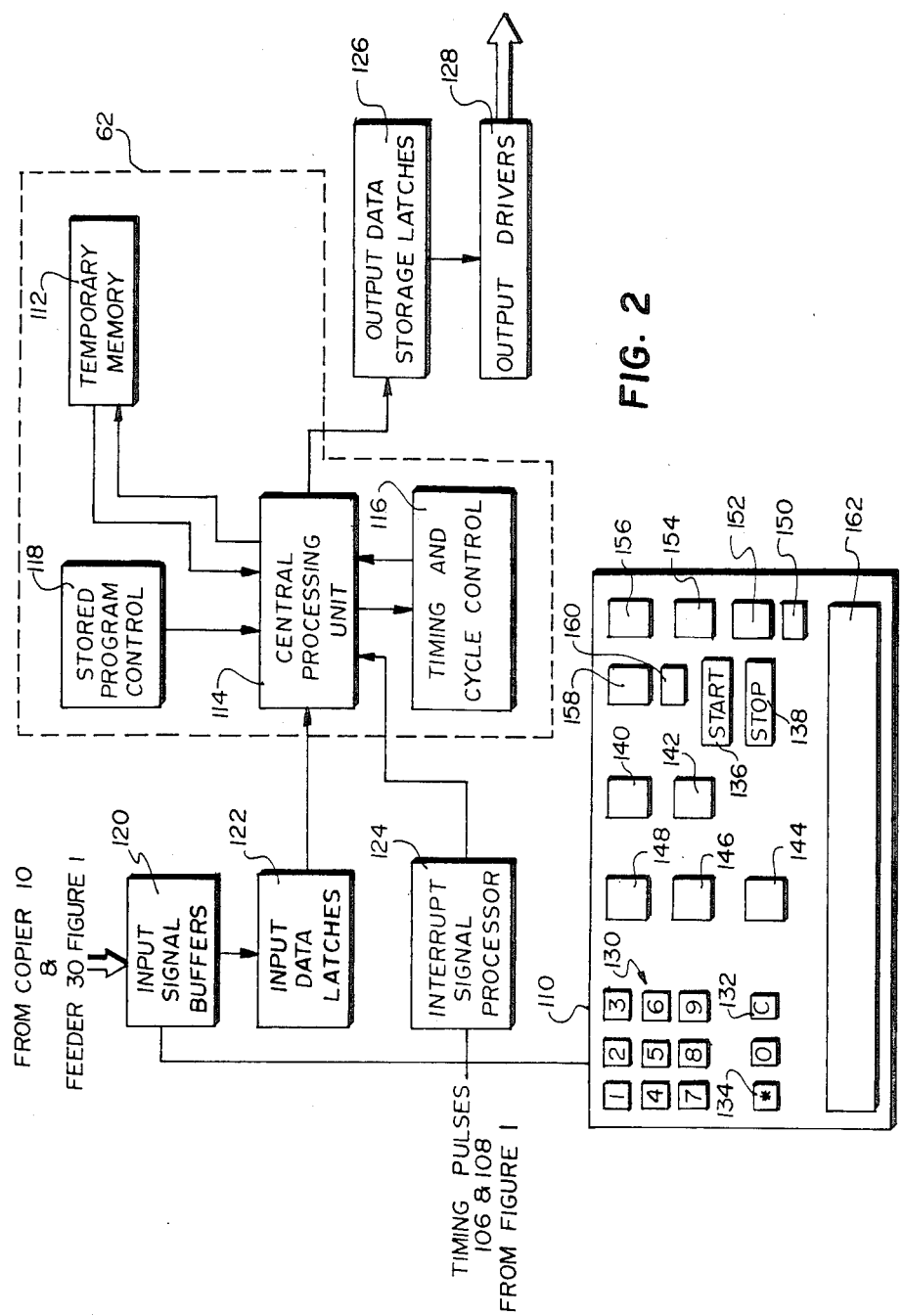
FIG. 2 is a block diagram of the logic and control unit and operator control panel of the apparatus of FIG. 1.

Referring now to FIG. 2, there is shown in greater detail an illustrative logic and control unit (LCU) 62 to which is connected operator control panel 110. LCU 62 has a programmable computer such as a microprocessor which has a stored program responsive to input signals for sequentially actuating the various instrumentalities of copier 10 and feeder 30. LCU 62 also controls the operation of many other functions of copier 10 as is disclosed in greater detail in U.S. Pat. No. 3,914,047. Programming of a number of commercially available microprocessors, such as Intel Model 8085 (which along with others can be used in accordance with the invention), is a conventional skill well understood in the art. The following disclosure is written to enable a programmer having ordinary skill in the art to produce an appropriate control program for the microprocessor. The particular details of any such program would of course depend on the architecture of the designated microprocessor.

In FIG. 2, a block diagram of logic and control unit 62 is shown which interfaces with copier 10 and feeder 30. A more detailed disclosure of the operation and structure of feeder 30 is disclosed in commonly assigned U.S. Pat. No. 4,099,860. LCU 62 includes temporary data storage memory 112, central processing unit 114, timing and cycle control unit 116, and stored program control unit 118 which comprises a read-only memory (ROM). Data input and output is performed sequentially under program control. Input data is applied to LCU 62 either through input signal buffers 120 to input data latches 122 or to interrupt signal processor 124.

The input signals are derived from various switches such as provided on operator control panel 110, from timing pulses such as from detector 106 and encoder 108 and from various analog to digital converters. The output data and control signals are applied to output data storage latches 126 which provide inputs to suitable output drivers 128 which are connected to various copier and feeder instrumentalities.

Operator control panel 110 includes a plurality of operator actuatable switches (buttons) only some of which are shown. For example, numerical keyboard 130 includes ten buttons for each of the numbers "0"–"9" inclusive. A "C" button 132 is used to cancel or clear the previous instructions fed in from panel 110 and star "*" button 134 which is actuated by the operator to designate simplex originals as first pages of copy sheets which are to be copied on the front side of copy sheets. A start button 136 initiates operation of copier 10 and stop button 138 terminates operation of copier 10. Copier 10 and feeder 30 may be operated in either a non-collate or collate mode. If the non-collate mode is desired, then button 140 is depressed and if the collate mode is desired, button 142 is depressed. In the non-collate mode, a set of originals placed in tray 32 of feeder 30 would be fed individually to copier platen 28 where the copier would make the number of copies requested by the operator for each original placed on platen 28 before making copies of the next original. On the other hand, in the collate mode, each original in a set is copied once to produce a collate copy set. The set of originals is then repeatedly recirculated until the number of copies requested is completed. Thus, in the non-collate mode, the output of the copier are sets of uncollated copies which must either be manually collated or collated in a sorter. On the other hand, when operating in the collate mode, a set of copies is produced which is already collated.

The originals which are fed to exposure platen 28 may either have images on both sides (duplex) or may have images only on one side (simplex). Similarly, the copies which are produced by copier 10 may be images on either one or two sides of the copy. Thus, if duplex output is not desired, then "No" button 144 would be actuated. If duplex output is desired, then the operator would either depress button 146 if one sided originals were placed in feeder 30 or button 148 if two sided originals were recirculated by feeder 130. Copier 10 may also be operated in a cover insertion mode in which special copy sheets may be provided from a supply to either the front or back of a copy set. If covers are not requested, then the operator would depress "No" button 150. Buttons 152, 154, and 156 respectively indicate to the copier whether covers are requested on the front, back or both front and back of a copy set. Buttons 158 and 160 are provided for feeding copies to side output tray 96 or to top output tray 94, respectively.

Other buttons not shown may also be provided on operator control panel 110 to regulate the exposure of a copy to select reduction or enlargement of an original, etc. Control panel 110 also includes a display 162 upon which messages are shown to indicate to the operator what mode the copier is operating in, what action should be taken next, where jams may be located in the copier, etc.

Figure 3:
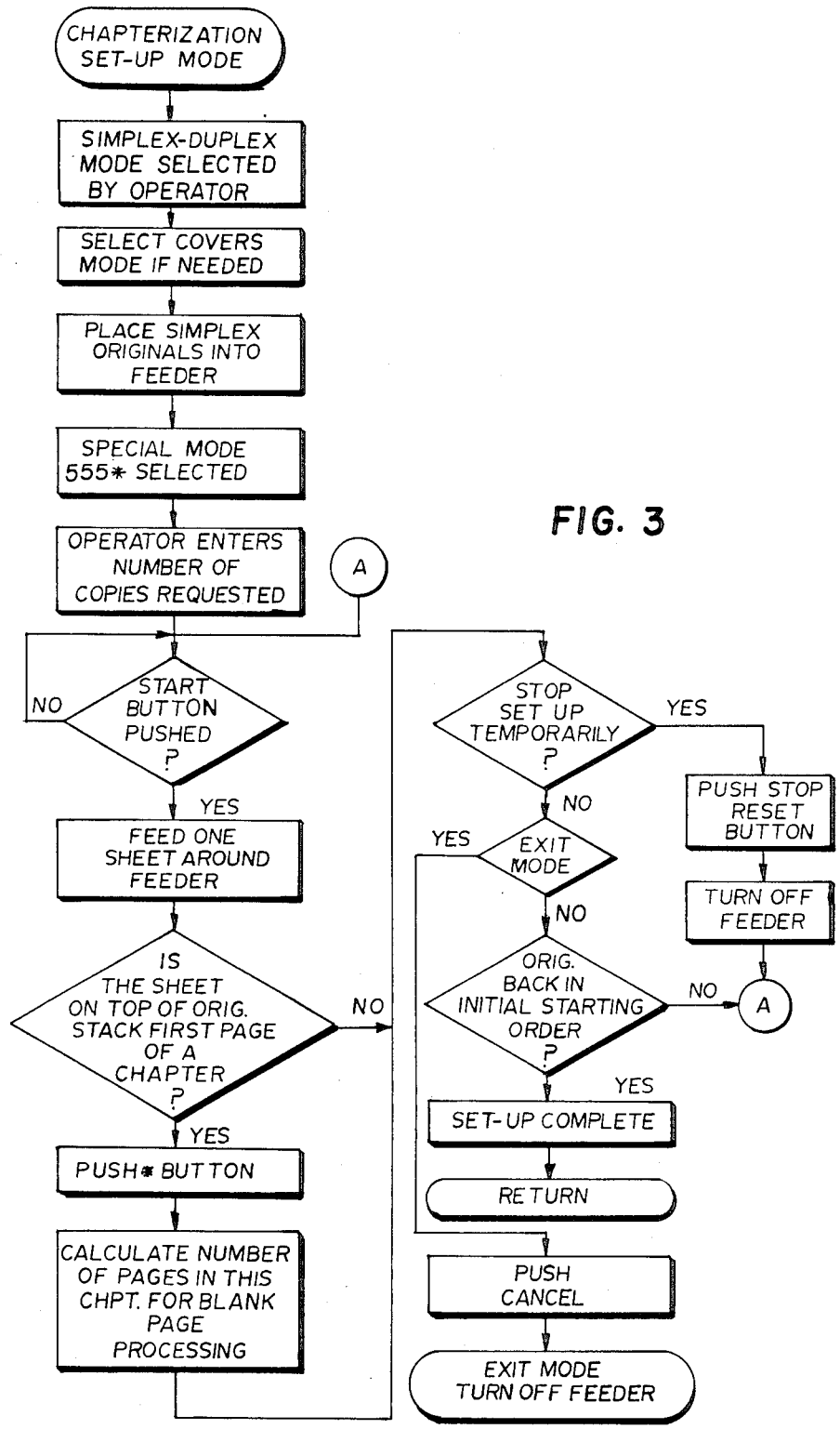
FIG. 3 is a flow chart of the setup mode of operation of the apparatus of FIG. 1.
Figure 4:
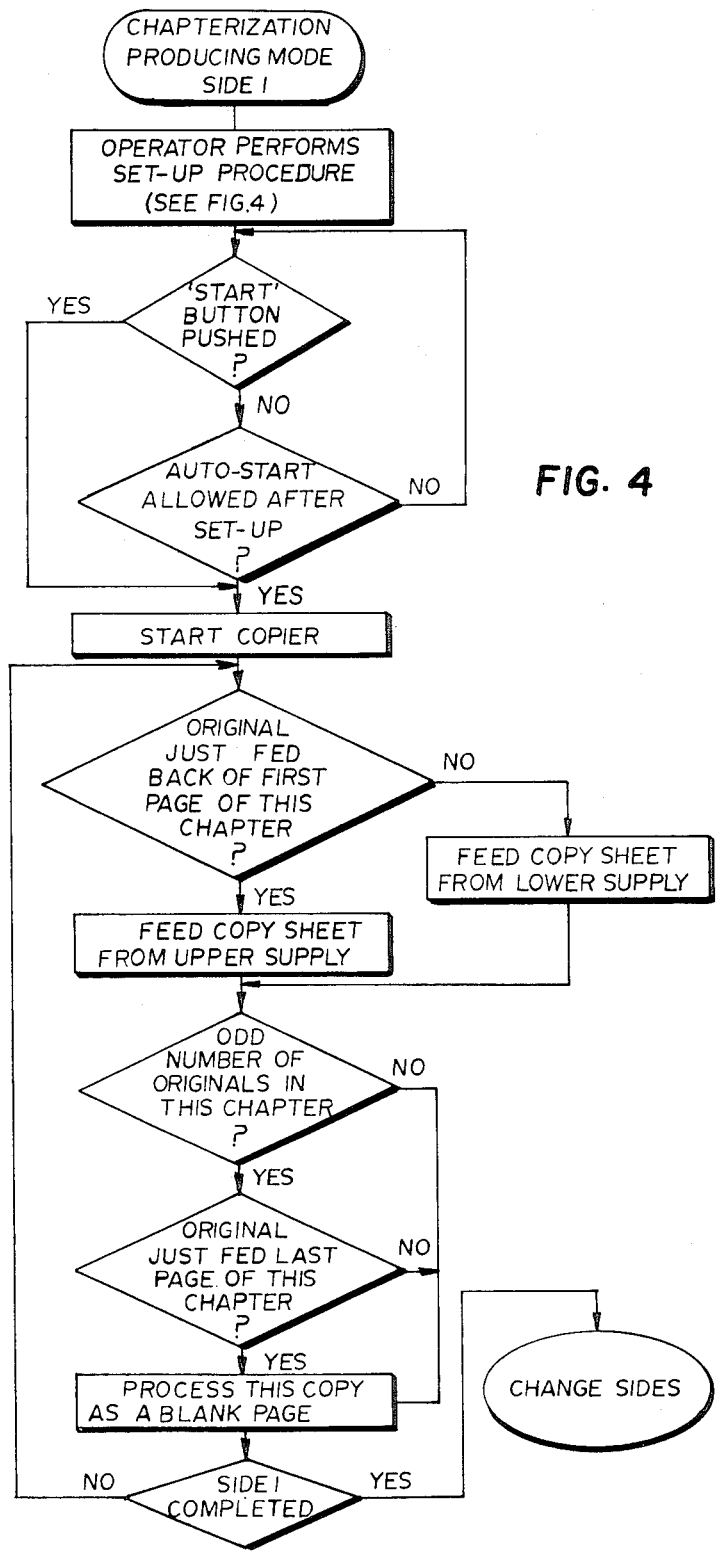
FIG. 4 is a flow chart of the producing mode of operation for side 1.
Figure 5:
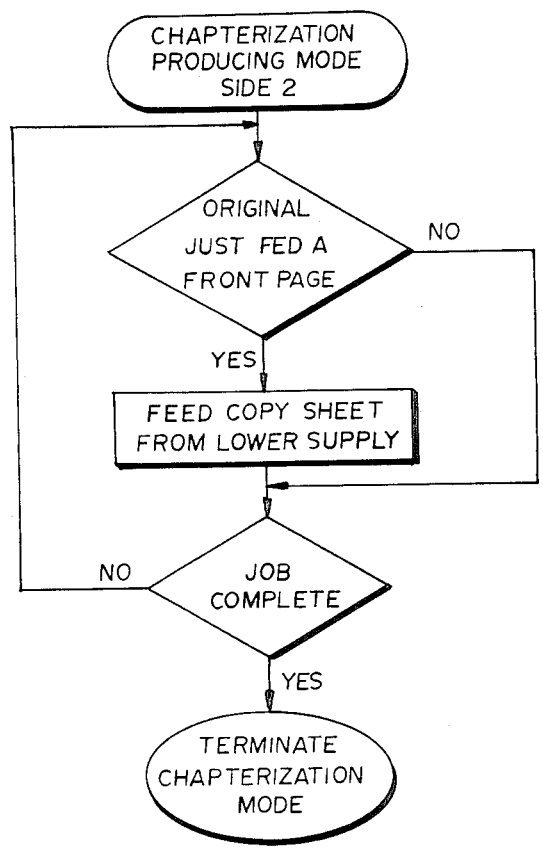
FIG. 5 is a flow chart of the producing mode of operation for side 2.

In FIG. 3, there is shown a flow chart of the setup mode operation of the apparatus of FIG. 1; flow charts of the producing mode are shown in FIGS. 4 and 5. For the purposes of this application, when the copier is in a mode wherein the first pages of duplex copy subsets or chapters are copied on the front of a copy sheet, it will be referred to as the chapterization mode. The chapterization mode includes a setup mode and a producing mode. In the chapterization setup mode, an operator actuates several buttons on panel 110. Thus, since a set of simplex originals are to be copied to produce a duplex copy set, button 146 indicating one sided originals with two-sided copy is actuated. Button 142 is actuated to indicate that feeder 30 is to operate in a collate mode. The side tray button 158 is actuated for a reason to be described in greater detail later. The operator also selects the appropriate button relating to covers. The operator then places a set of simplex originals into tray 32 of feeder 30. The originals are in page sequential order with the highest numbered original on the bottom of the set.

The operator now indicates to LCU 62 that copier 10 is to be operated in the special chapterization mode by depressing the "5" button on numerical keyboard 130 three times and then depressing "*" button 134 (555*). Display 162 will now show the message "copier is now in chapterization mode." The last instruction to be entered on operator control panel 110 is the number of copies requested of each set which is entered on numerical keyboard 130.

Feeder 30 is now under the manual control of the operator and originals 34 may be sequentially recirculated to the top of the set by repeatedly actuating start button 136. As an original 34 passes detector 60, a count signal is generated and stored in temporary memory 112. If the original which has circulated to the top of the set is not one that is the first page of a chapter and if a decision has not been made to temporarily stop or exit the setup mode and if the originals are not back in their initial starting order, then the routine will be returned via "A" to circulate another original.

If the original on top of the original stack is the first page of a chapter or copy subset, then the operator presses "*" button 134 to store in memory 112 the number of the original which is to be so processed. Since logic and control unit 62 has been counting the number of originals which have been circulated from the bottom of the set placed in tray 32, it calculates the number of originals in each chapter. If the number of originals in a chapter is even then nothing will be done. If the number of original sheets in a chapter is odd, then the back page of the last duplex copy sheet in the chapter is processed as a blank page. This can be effected by means of an erase lamp 164 which extends the width of belt 12 and is located between exposure station 70 and development station 72.

If it is desired to stop the setup mode temporarily, stop button 138 is actuated to turn off the feeder for a short period of time. The routine would then return to "A" by pushing start button 136 to circulate another original. If, on the other hand, it is desired to exit or cancel the setup mode, then cancel button 132 is actuated by the operator to turn feeder 30 off and to return copier 10 to its normal operating mode.

When the last original to be circulated is back in the initial starting order, the setup mode is completed and the copier is ready to start the producing mode (FIG. 3). This may be effected by pushing start button 136. The copier may be programmed, however, to start automatically after setup and after a predetermined delay period. In either event, the copier is started to produce duplex copies from the simplex originals in feeder 30.

At this point, it is useful to describe the operation of copier 10 in the simplex to duplex mode without chapterization. A job will be assumed in which no covers are requested and a set of eight simplex originals are placed in feeder tray 32. The operator actuates the "start" button 136 to circulate the originals to determine whether the number of originals is odd or even. In the example, the number of originals is even. Thus, as feeder 30 circulates the originals to exposure platen 28 only even numbered originals are exposed as the back sides of the duplex copies to be produced. Odd numbered originals are not exposed. Copy sheets will be fed from lower supply 82 to receive the even numbered images and after fusing will be fed into side output tray 96 with the back side facing down. After feeder 30 has circulated all of the originals back to the top of tray 32, the operation of copier 10 is stopped. The operator removes the copies from tray 96, inverts them, and places them in upper supply 78 with the back sides facing up and in reverse page order (e.g., page 8, page 6, etc.).

The operator now presses "start" button 136 and feeder 30 circulates the originals from tray 32 a second time. During this circulation, however, only the odd numbered originals are exposed. Thus, the first original containing page 8 would be circulated without exposing whereas the next original containing page 7 would be exposed. The copy sheet having a copy of page 8 on its back side is fed out of tray 78 by feed roller 80 to receive from belt 12 the image of original 7 on its front side. The duplex copy is fed to output tray 94 with the odd page (front side) facing up. The originals with odd pages 5, 3, and 1 are similarly circulated and reproduced on the front sides of the copy sheets with pages 6, 4, and 2 on their back sides until a completed duplex set is fed into tray 94.

If the number of simplex originals is odd, as determined by a precirculation count of originals in the feeder, then prior to the first exposing circulation of originals, a copy sheet is fed out from supply 82 and deposited in tray 96 with a blank image on the back side of the copy sheet. Original "7" is then circulated without being exposed and the first original to be exposed is original "6" which is copied on a second sheet fed from supply 82. The originals are circulated until all of the even numbered originals are copied. The operator now removes the simplex copies from tray 96, inverts them, and places them in upper supply 78 with the blank sheet facing up. During the second circulation of the originals, when the original corresponding to page "7" is fed to platen 28, it will be exposed and received by the first copy sheet. The odd originals will then be sequentially exposed and a completed duplex copy delivered to tray 94 in page sequential order.

It will now be convenient to resume a description of the operation of copier 10 in the chapterization mode. With particular reference to FIG. 4, after copier 10 is started in the production mode feeder 30 will sequentially circulate originals twice to exposure platen 28, first exposing the originals which form the back pages and then exposing the originals which form the front pages. In order to more clearly illustrate this mode of operation, it is assumed that nine simplex originals are placed in tray 32 and that pages 1, 4, and 7 have been designated by the operator to be first pages of chapters 1, 2, and 3. Thus, the desired copy sheet duplex set would have the following makeup: originals 1 and 2 are copied on the front and back sides of the first copy sheet; original 3 is copied on the front side of the second copy sheet with the back side blank; original 4 which is the first page of a chapter, is copied on the front side of the third copy sheet; and original 5 on the back side thereof. Original 6 is copied on the front side of the fourth copy sheet and the back side is blank; Original 7 is copied on the front side of the fifth copy sheet since it is the first page of a chapter and original 8 is copied on the back side thereof; and original 9 is imaged on the front side of the sixth copy sheet with the back side blank.

After copier 10 has gone through the set-up mode, logic and control unit 62 has stored therein the identity of all originals which will appear as back sides. Thus, if the original just fed is a back side, the right kind of copy sheet is determined as shown in FIG. 4. Logic and control unit 62 determines whether the original just fed is the back of the first page of a chapter. If it is not, then a copy sheet is fed from lower supply 82 which contains normal copy sheets such as white sheets. If, however, the original just fed is the back of the first page of a chapter, then a copy sheet is fed from upper supply 78 which may, for example, include copy sheets of the same or of a different color such as yellow. If the first page of a chapter is the same color as the other pages, it could also be fed from lower supply 82. LCU 62 then determines whether there are an odd number of originals in the chapter. If there are, the determination is made whether the original just fed is the last page of the chapter. If it is, then this page is processed as a blank page on a copy sheet is fed from lower supply 82. If the number of originals in the chapter is even, then the routine is returned to determining whether the original just fed is the back of the first page of the chapter. Similarly, if the number of originals in a chapter is odd, and the original just fed is not the back of the last page of the chapter then the routine will be returned if side 1 (back pages) is not completed.

After side 1 is completed, using the example given above of nine simplex originals with pages 1, 4 and 7 as first pages of chapters, tray 96 would contain a stack having a copy of original 2, a blank sheet, copy of original 5, blank sheet, copy of original 8, and another blank sheet. As noted previously, the operator removes the stack of sheets from tray 96, inverts them, and places them in upper supply 78 in preparation for the copying of side 2. Side 2 (front pages) is placed on the copy sheets, as shown, in the flow chart in FIG. 5. In the example given, originals 1, 3, 4, 6, 7 and 9 appear as front pages. When all of the front pages have been copied, the chapterization mode is terminated.

It will be understood that the first page of a chapter may be on sheets of different weight than the other pages; for example, the first page could be a tabbed sheet.

From the foregoing, it will be apparent that the disclosed invention provides a particularly advantageous means for producing a set of duplex copies in which the first page of each subset is on the front side of a copy.

The invention has been described in detail with particular reference to a preferred embodiment thereof, but it will be understood that variations and modifications can be effected within the spirit and scope of the invention.

What is claimed is:

1. Apparatus for copying a set of simplex originals to produce a set of duplex copies having subsets in which the first page of each subset is on the front side of a copy comprising:

producing means for producing images of originals, said producing means including an exposure position;

recirculating means for receiving a set of simplex originals at a receiving position and for sequentially recirculating individual originals from said receiving position to said exposure position and then back to said receiving position;

supply means for selectively supplying copy sheets to receive images from said producing means; and control means operable (1) in a setup mode for controlling said circulating means to circulate originals one at a time under operator control, said control means including operator actuatable means for designating individual simplex originals as the first pages of subsets of copies and (2) in a producing mode for controlling (a) said circulating means to circulate said simplex originals to said exposing position, (b) said producing means to produce sequential images of said originals, and (c) said supply means to supply to said producing means copy sheets to receive images of simplex originals on the front and back sides of said copy sheets with the designated first page of each subset being received on the front side of a copy sheet.

2. The apparatus of claim 1 wherein said control means is operable in said setup mode to count the number of simplex originals to be copied in each subset to determine if such number is odd or even and wherein in said producing mode, if the number of simplex originals in a subset is odd then the back side of the last copy sheet in a copy subset is processed as a blank sheet.

3. The apparatus of claim 1 wherein said supply means includes first and second supplies of copy sheets and wherein in said producing mode said control means causes said first supply to supply a copy sheet which is to receive from said producing means on the front side thereof an image corresponding to an original which is designated as a first page of a copy subset and causes said second supply to supply a copy sheet which is to receive from said producing means on the front side thereof an image corresponding to a nondesignated original.

4. The apparatus of claim 3 wherein said first and second supplies respectively have copy sheets of first and second characteristics so that the first copy sheet of a subset is of said first characteristic and the other copy sheets of said subset are of said second characteristic.

5. Electrophotographic apparatus for copying a set of simplex originals to produce a set of duplex copies having subsets in which the first page of each subset is on the front side of a copy, comprising:

an image producing section including a moving photoconductive member upon which transferable images are formed and including an exposure platen;

a circulating feeder located adjacent to said exposure platen;

said feeder including a tray for receiving a set of simplex originals in page sequential order and operable to feed originals sequentially from the bottom of a received set to said exposure platen and back to the top of said set;

supply means for selectively supplying copy sheets to receive images from said producing means; and programmable control means operable (1) in a setup mode for controlling said circulating feeder to circulate originals one at a time under operator control, said control means including means for generating a count signal as each original is circulated and further including an operator actuatable switch for designating originals which have been circulated back to the top of said set as ones to be copied as the first pages of copy subsets such that the positions of designated originals within said set of originals is stored by said control means; and (2) in a producing mode for controlling (a) said circulating feeder to circulate originals sequentially to said exposure platen, (b) said image producing section to form transferable images of said originals on said photoconductive member, and (c) said supply means to supply copy sheets to said producing means to receive images of said simplex originals on the front and back sides of said copy sheets with the designated first pages of each subset being received on the front side of a copy sheet.

6. The apparatus of claim 5 wherein said control means is operable in said setup mode to count the number of simplex originals to be copied in each subset to determine if such number is odd or even and wherein said control means is operable in said producing mode, if the number of simplex originals to be copied in a subset is odd to process the back side of the last copy sheet in a copy subset as a blank sheet.

* * * * *